United States Patent
Kim et al.

(10) Patent No.: US 9,791,741 B2
(45) Date of Patent: Oct. 17, 2017

(54) ALIGNMENT FILM, METHOD FOR FORMING ALIGNMENT FILM, METHOD FOR ADJUSTING LIQUID CRYSTAL ALIGNMENT, AND LIQUID CRYSTAL DISPLAY DEVICE

(75) Inventors: Hak-Rin Kim, Daegu (KR); Chang Sub Park, Busan (KR); Kyung Il Joo, Daegu (KR); Min Kyu Park, Daegu (KR)

(73) Assignee: Kyungpook National University Industry-Academic Cooperation Foundation, Daegu (KR)

( * ) Notice: Subject to any disclaimer, the term of this patent is extended or adjusted under 35 U.S.C. 154(b) by 304 days.

(21) Appl. No.: 14/351,634

(22) PCT Filed: Oct. 14, 2011

(86) PCT No.: PCT/KR2011/007672
§ 371 (c)(1),
(2), (4) Date: Apr. 14, 2014

(87) PCT Pub. No.: WO2013/054962
PCT Pub. Date: Apr. 18, 2013

(65) Prior Publication Data
US 2014/0247417 A1    Sep. 4, 2014

(51) Int. Cl.
*G02F 1/1337* (2006.01)
*G02F 1/29* (2006.01)

(52) U.S. Cl.
CPC ........ *G02F 1/1337* (2013.01); *G02F 1/13378* (2013.01); *G02F 1/29* (2013.01);
(Continued)

(58) Field of Classification Search
CPC ............ G02F 1/1337; G02F 1/133711; G02F 1/133753; G02F 1/13378;
(Continued)

(56) References Cited

U.S. PATENT DOCUMENTS 8,031,310 B2    10/2011    Tamaki et al.
2005/0094072 A1*    5/2005    Lu ................... G02F 1/13378
349/123

(Continued)

FOREIGN PATENT DOCUMENTS

GB    2290629 A  *  1/1996
JP    H08-095047 A    4/1996
(Continued)

OTHER PUBLICATIONS

International Search Report for PCT/KR2011/007672 dated Jul. 30, 2012.

*Primary Examiner* — Nathanael R Briggs
*Assistant Examiner* — William Peterson
(74) *Attorney, Agent, or Firm* — Harness, Dickey & Pierce, P.L.C.

(57) ABSTRACT

Provided is a method for controlling liquid crystal alignment. An alignment film has a plurality of first grooves which are elongated in a first direction and area spaced from each other, and a plurality of second grooves which are elongated in a second direction and are spaced from each other by crossing said first grooves. Multistable liquid crystal alignment is enabled selectively by adjusting an aspect ratio of said first grooves and an aspect ratio of said second grooves.

6 Claims, 17 Drawing Sheets

(52) U.S. Cl.
CPC ............ *G02F 2001/133773* (2013.01); *G02F 2001/133776* (2013.01); *Y10T 428/24587* (2015.01)

(58) Field of Classification Search
CPC ........ G02F 2001/133757; G02F 2001/133776; G02F 1/29; G02F 2001/133773; Y10T 428/24587
USPC ........................................................ 349/123
See application file for complete search history.

(56) References Cited

U.S. PATENT DOCUMENTS

| | | |
|---|---|---|
| 2006/0290856 A1 | 12/2006 | Lim |
| 2009/0009703 A1 | 1/2009 | Tamaki et al. |

FOREIGN PATENT DOCUMENTS

| | | |
|---|---|---|
| KR | 2005-0113747 A | 12/2005 |
| KR | 2006-0134759 A | 12/2006 |
| KR | 2007-0119624 A | 12/2007 |
| KR | 2008-0020057 A | 3/2008 |
| KR | 2009-0004637 A | 1/2009 |
| KR | 2009-0059458 A | 6/2009 |
| KR | 2009-0082101 A | 7/2009 |
| KR | 2011-0026656 A | 3/2011 |

\* cited by examiner

US 9,791,741 B2

ALIGNMENT FILM, METHOD FOR FORMING ALIGNMENT FILM, METHOD FOR ADJUSTING LIQUID CRYSTAL ALIGNMENT, AND LIQUID CRYSTAL DISPLAY DEVICE

This application is a national phase under 35 U.S.C. §371 of PCT International Application No. PCT/KR2011/007672 which has an International filing date of Oct. 14, 2011; the entire contents of which are hereby incorporated by reference.

For the invention supported by Regional Innovation Project (3D Vision System Microminiature Modulazation Technique Development based on a High Speed Dynamic Interference Pattern Generator) during 2013 Apr. 1~2014 Apr. 30, this research was financially supported by the Ministry of Education (MOE) and National Research Foundation of Korea (NRF) through the Human Resource Training Project for Regional Innovation (NRF-2012H1B8A2026187).

For the invention supported by ERC Project (Functional Device Fusion Platform Research Center) during 2014 Mar. 1~2015 Feb. 28, this work was supported by the National Research Foundation of Korea (NRF) grant funded by the Korea government (MSIP) (2008-0062617).

TECHNICAL FIELD

The present disclosure herein relates to a display device, and more particularly, to an alignment film used for the display device, a method of forming the alignment film, and a method of adjusting liquid crystal alignment.

BACKGROUND ART

Recently, as a demand for portable electronic products such as laptop personal computers and cellular phones increases, a demand for flat panel displays (FPD) having a small thickness and light weight increases. Among FPDs, particularly, liquid crystal displays (LCD), compared with other displays having the same screen size, have a light weight and a small volume and operate at lower power, thereby being generally used recently.

LCDs convert an inputted electric signal into visual information and transmit an image by using properties of a liquid crystal that is an intermediate material between a liquid and crystals, in which the liquid crystal varies in optical transmittance due to electrooptic modulation according to an applied voltage while being disposed between polarizer pairs. That is, a general LCD is formed of two substrates provided with an electrode and a liquid crystal is injected between the substrates and an electric field is applied to the liquid crystal by applying a voltage to two substrates, in which arrays of liquid crystal molecules are changed and optical transmittance between polarizer pairs is changed.

It is due to dielectric constant anisotropy of the liquid crystal that the liquid crystal is changed in array according to the electric field. That is, liquid crystal molecules have properties, in which a long axis direction and a short axis direction differ in dielectric constant. Due thereto, when an electric field is applied, electric forces acting in the long axis direction and the short axis direction differ. A difference between the electric forces becomes a driving source for rotating liquid crystal molecules. The liquid crystal, depending on the type, has positive dielectric constant anisotropy or negative dielectric constant anisotropy. That is, based on the long axis direction of the liquid crystal, when an electric field is applied, the former is arranged to be parallel to a direction of the electric field and the latter is arranged to be perpendicular to the direction of the electric field.

The liquid crystal also has refractive index anisotropy, which allows transmittance of light to vary with an alignment state of the liquid crystal. However, the refractive index anisotropy of the liquid crystal causes a narrowing of a viewing angle in LCDs. The viewing angle indicates a direction, in which a viewer sees a display screen. An image of the LCD is more distorted in flank than in front in such a way that the viewing angle thereof is narrower than other display devices. This is, when the liquid crystal is arranged to slant to the front, although a certain amount of light is transmitted in the front and a proper image is shown but light is not transmitted in flank, to which the liquid crystal slants, due to the refractive index anisotropy of the liquid crystal and the image may be distorted.

To overcome a limitation in the viewing angle of the LCD, a single pixel may be divided into areas and liquid crystals in the respective areas may be arranged to slant to different directions. That is, in respective areas of each pixel, multi-domains according to liquid crystal array directions are formed. When liquid crystals in a first area are arranged to slant in a first direction and liquid crystals in a second area are arranged to slant in a second direction, although light is not transmitted through the liquid crystals in the first area from one side, since the light may be transmitted through the liquid crystals in the second area, a viewing angle of an LCD may increase.

Multi-domain LCDs have an excellent viewing angle but are not formed with azimuthal anchoring energy.

On the other hand, recently, multi-stable LCDs of forming multi-patterns having a submicro size on an alignment film have been provided. Multi-stable LCDs may preserve contents without electric regeneration due to multi-array layers having a submicro size although power is turned off. Patterns having the submicro size are formed using one of multi-rubbing, multi photo arrangement, nano-imprinting, etc.

However, methods of forming patterns having a submicro size as described above do not have a high yield, are difficult to be applied to a large sized panel, and do not adjust alignment of a liquid crystal director.

DISCLOSURE OF THE INVENTION

Technical Problem

The present disclosure provides an alignment layer and a method of forming the alignment layer.

The present disclosure also provides a mold for imprinting an alignment layer and a method of forming the mold.

The present disclosure also provides a liquid crystal display (LCD).

The present disclosure also provides a method of adjusting liquid crystal alignment.

Technical Solution

Embodiments of the present invention provide methods of forming an alignment film for aligning liquid crystals, including forming a plurality of first grooves extending in a first direction and spaced from one another and a plurality of second grooves extending in a second direction to intersect the first grooves and spaced from one another, in which the first grooves and the second grooves have different widths and depths.

In other embodiments of the present invention, methods of forming a mold for imprinting an alignment film include forming a plurality of first projections extending in a first direction and spaced from one another on an elastic film and forming a plurality of second projections extending in a second direction to intersect the first projections and spaced from one another on the elastic film, in which the forming of the second projections includes expanding the elastic film formed with the first projections, performing contraction control treatment to control contraction of the expanded elastic film, and contracting the expanded elastic film.

In still other embodiments of the present invention, methods of forming an alignment film include imprinting an elastic film formed using the method of forming the mold for imprinting the alignment film on the alignment film and forming a plurality of first grooves corresponding to the first projections and spaced from one another and a plurality of second grooves corresponding to the second projections and spaced from one another.

In even other embodiments of the present invention, alignment films for aligning liquid crystals of a liquid crystal display (LCD) includes a plurality of first grooves extending in a first direction and spaced from one another and a plurality of second grooves extending in a second direction to intersect the first grooves and spaced from one another.

In yet other embodiments of the present invention, liquid crystal displays (LCD) include a first substrate and a second substrate facing each other and a first alignment film and a second alignment film formed on surfaces of the first substrate and the second substrate facing each other, in which the first alignment film and the second alignment film each includes a plurality of first grooves extending in a first direction and spaced from one another and a plurality of second grooves extending in a second direction to intersect the first grooves and spaced from one another.

In further embodiments of the present invention, multistable LCDs include a first substrate and a second substrate facing each other and a first alignment film and a second alignment film formed on surfaces of the first substrate and the second substrate facing each other, in which the first alignment film and the second alignment film each includes a plurality of first grooves extending in a first direction and spaced from one another and a plurality of second grooves extending in a second direction to intersect the first grooves and spaced from one another. Also, a ratio between azimuthal anchoring energy according to the first grooves and azimuthal anchoring energy according to the second grooves is about 1.

In still further embodiments of the present invention, multi-domain LCDs include a first substrate and a second substrate facing each other and a first alignment film and a second alignment film formed on surfaces of the first substrate and the second substrate facing each other, in which the first alignment film and the second alignment film each includes a plurality of first grooves extending in a first direction and spaced from one another and a plurality of second grooves extending in a second direction to intersect the first grooves and spaced from one another. Also, a ratio between azimuthal anchoring energy according to the first grooves and azimuthal anchoring energy according to the second grooves is about 0.

In even further embodiments of the present invention, liquid crystal alignment methods applied to an LCD include forming a plurality of first grooves extending in a first direction and spaced from one another and a plurality of second grooves extending in a second direction to intersect the first grooves and spaced from one another, in which one of multistable liquid crystal alignment and multi-domain liquid crystal alignment is selectively enabled by controlling an aspect ratio of the first grooves and an aspect ratio of the second grooves.

In yet further embodiments of the present invention, elastic films as a mold for imprinting an alignment film include a plurality of first projections extending in a first direction and spaced from one another and a plurality of second projections extending in a second direction to intersect the first projections and spaced from one another, in which a height and width of the first projections are different from a height and width of the second projections.

Advantageous Effects

According to one embodiment of the inventive concept, an alignment film may be formed without a general rubbing process.

According to one embodiment of the inventive concept, an alignment film may be simply and economically formed by an imprinting method using an elastic film formed with a dual pattern.

According to one embodiment of the inventive concept, a large-sized multistable liquid crystal display (LCD) may be easily manufactured.

According to one embodiment of the inventive concept, azimuthal anchoring energy may be easily controlled.

According to one embodiment of the inventive concept, a multi-domain bistable LCD may be easily manufactured.

MODE FOR CARRYING OUT THE INVENTION

Figure 1:
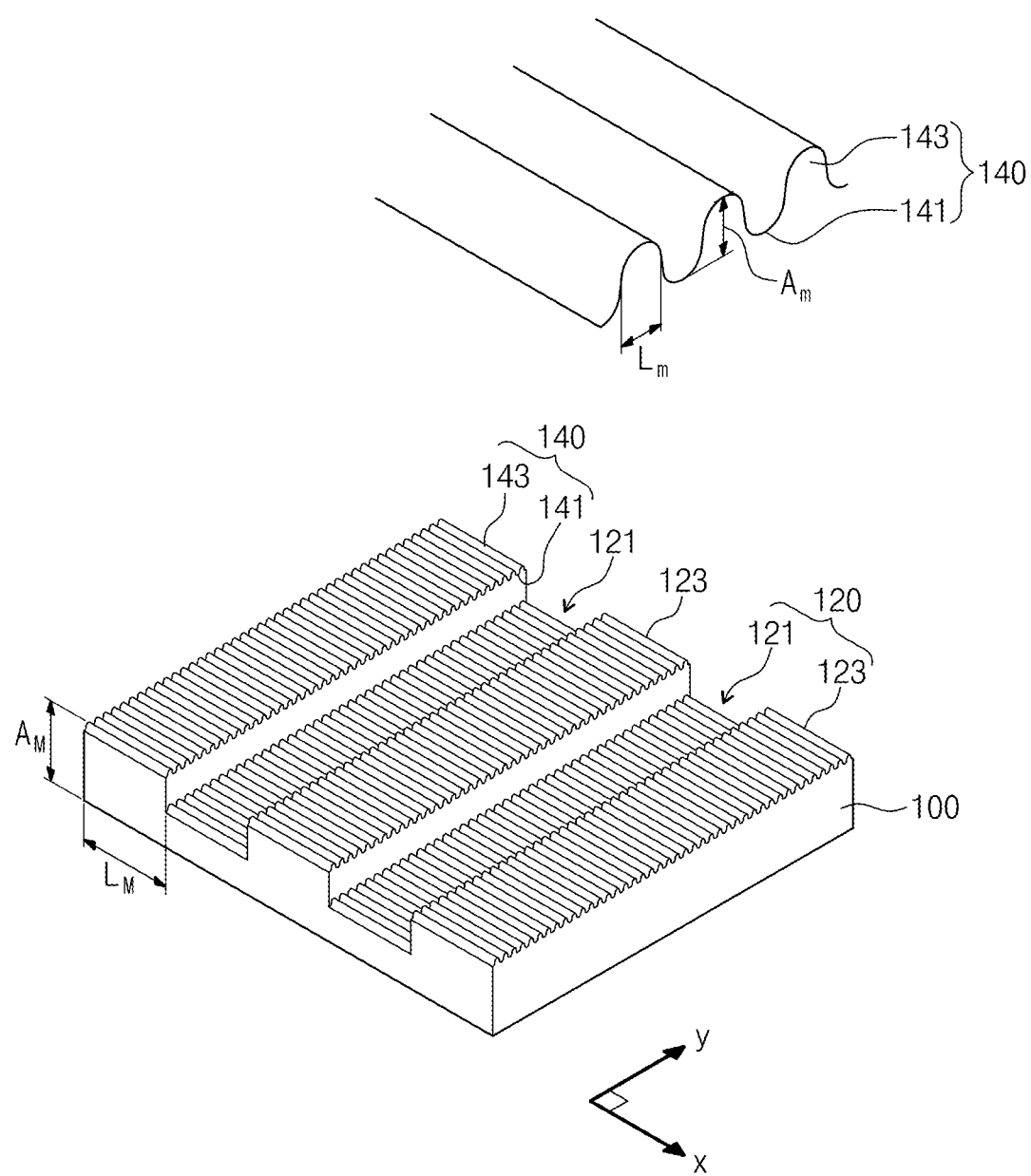
FIG. 1 is a schematic view of an alignment film having a dual concavo-convex structure according to an embodiment of the inventive concept.

Embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Although not defined, all terms used herein, including technical or scientific terms, have the same meanings generally adopted by ordinary skills in the art. Terms defined by general dictionaries may be understood as having the same meanings as those of related arts and/or the body of the present application. Also, an expression, not clearly defined herein, will neither be conceptualized nor excessively formally understood.

Terms used in the specification are to describe the embodiments but not to limit the scope of the present invention. As used herein, the singular forms are intended to include the plural forms as well, unless the context clearly indicates otherwise. It will be further understood that the terms "comprises" and/or "comprising" used herein specify the presence of stated features or components, but do not preclude the presence or addition of one or more other features or components. In the specification, the term "and/or" indicates each of listed components or various combinations thereof.

It will be understood that when a layer is referred to as being "formed on," another layer or a substrate, it can be directly or indirectly formed on the other layer or the substrate. That is, for example, intervening layers may be present.

Also, the embodiments described in the specification will be explained with reference to cross-sectional views and/or top views. In the drawings, thicknesses of a film and an area may be exaggerated to effectively explain technical contents. Accordingly, shapes shown in the drawings may be changed by manufacturing technology and/or tolerable errors. Accordingly, the embodiments of the present invention are not limited to certain shapes shown in the drawings but include variations in shape formed according to a manufacturing process. Accordingly, areas shown in the drawings have schematic properties and shapes of areas shown in the drawings are merely to illustrate certain shapes of elements but not to limit the scope of the present invention.

The inventive concept provides a method of adjusting liquid crystal alignment, an alignment film manufactured according to the method, and a liquid crystal display (LCD). The alignment film has a dual concavo-convex (dual groove) structure. Two kinds of concavo-convexes forming the dual concavo-convex structure have different sizes from one another. For example, the two concavo-convex structures include grooves having mutually different depths and widths. Otherwise, the two concavo-convex structures include projections having mutually different heights and widths. An aspect ratio of the grooves or projections is appropriately adjusted, thereby controlling an arrangement direction of liquid crystals and selectively providing a multi-stable LCD or multi-domain LCD.

Hereinafter, it will be described in detail with reference to the drawings.

FIG. 1 is a schematic view of an alignment film 100 having a dual concavo-convex structure according to an embodiment of the inventive concept.

Referring to FIG. 1, the alignment layer 100 includes a plurality of first grooves 121 extending in a first direction, that is, a y-axis direction in FIG. 1 and spaced from one another and a plurality of second grooves 141 extending in a second direction, that is, an x-axis direction in FIG. 1 to intersect the first grooves 121 and spaced from one another. The first grooves 121 and the second grooves 141, for example, may be perpendicular to one another. That is, the first grooves 121 are periodically arranged in the second direction and the second grooves 141 are periodically arranged in the first direction while being perpendicular to the first grooves 121. A projection may be defined between adjacent grooves from periodical arrangement of the grooves. For example, a first projection 123 may be defined between the adjacent first grooves, and a second projection 143 may be defined between the adjacent second grooves. That is, the first groove 121 and the first projection 123 are alternately disposed in the second direction, that is, the x-axis direction and the second groove 141 and the second projection 143 are alternately disposed in the first direction, that is, the y-axis direction. A depth of a groove corresponds to a height of a projection, a distance between adjacent grooves corresponds to a width of the projection, and a distance between the projections corresponds to a width of the groove.

The first grooves 121 and the second grooves 141, for example, may be formed to have mutually different sizes. For example, a depth AM and a width LM of the first groove 121 may be greater than a depth Am and a width Lm of the second groove 141. Also, a height and a width of the first projection 123 may be greater than a height and a width of the second projection 143. Hereinafter, in a description for the alignment film 100, only for convenience of description and better understanding, the first grooves 121 relatively greater may be designated as macro-grooves and the second grooves 141 relatively smaller may be designated as micro-grooves. Similarly, the first projections 123 relatively greater between the macro-grooves may be designated as macro-projections and the second projections 143 relatively smaller between the micro-grooves may be designated as micro-projections. However, a depth and a width of a groove or a height and a width of a projection will not be limited to their designations. Also, a structure, in which the macro-grooves 121 and the macro-projections 123 are alternately arranged, may be designated as a macro concavo-convex structure 120 and a structure, in which the micro-grooves 141 and the micro-projections 143 are alternately arranged, may be designated as a micro concavo-convex structure 140.

An aspect ratio of a groove is defined as a depth of the groove/a width of the groove. Similarly, an aspect ratio of a projection is defined as a height of the projection/a width of the projection. In the embodiment, it is possible to easily control an array of liquid crystals in an alignment film by adjusting aspect ratios of the macro-grooves 121 and the micro-grooves 141.

Figure 2:
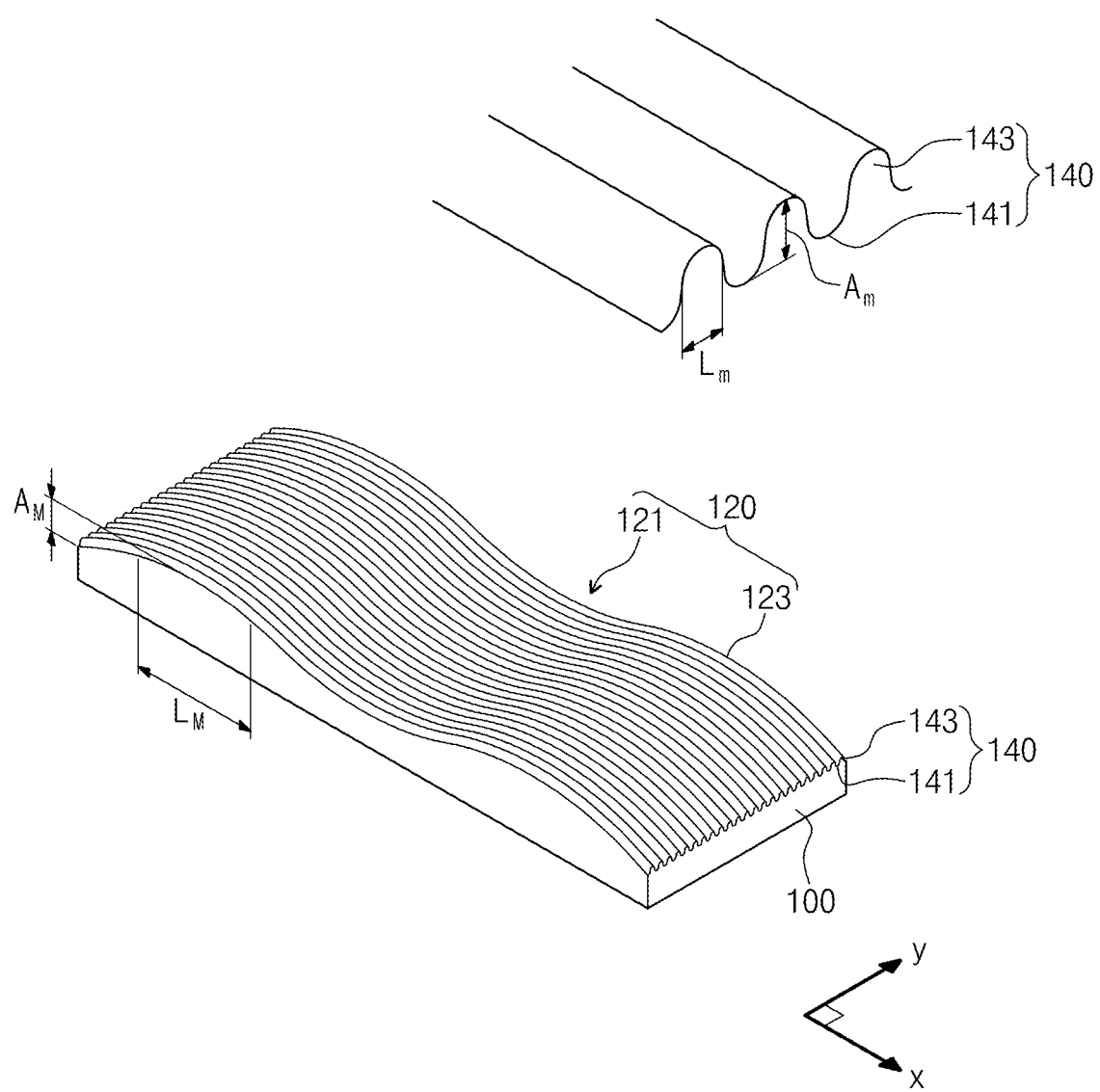
FIG. 2 is a schematic view of an alignment film having a dual concavo-convex structure according to another embodiment of the inventive concept.

FIG. 2 is an alignment film having a dual concavo-convex structure according to another embodiment of the inventive concept. The alignment film is identical to the alignment film of FIG. 1 in a dual groove structure but is slightly different in shapes of a groove and a projection. In the alignment film of FIG. 2, a bottom and a sidewall of the groove, that is, a top surface and a sidewall of the projection are formed to be curved, differing from the groove of FIG. 1, which is formed to be slightly flat. However, in the embodiment, it is possible to easily control alignment of liquid crystals in the alignment film by adjusting aspect ratios of a first groove and a second groove.

Hereinafter, a method of controlling alignment of liquid crystals will be described. The alignment of liquid crystals receives an effect from a surface topology of the alignment film, on which the liquid crystals are disposed. An anisotropic interactive force received by the liquid crystals from the alignment film is shown as azimuthal anchoring energy between the liquid crystals and a surface of the alignment film. The alignment of the liquid crystals may be determined by the azimuthal anchoring energy. Also, the azimuthal anchoring energy relates to an aspect ratio of a groove.

Multi-Stable Liquid Crystal Arrangement by Dual Groove Pattern

Figure 3:
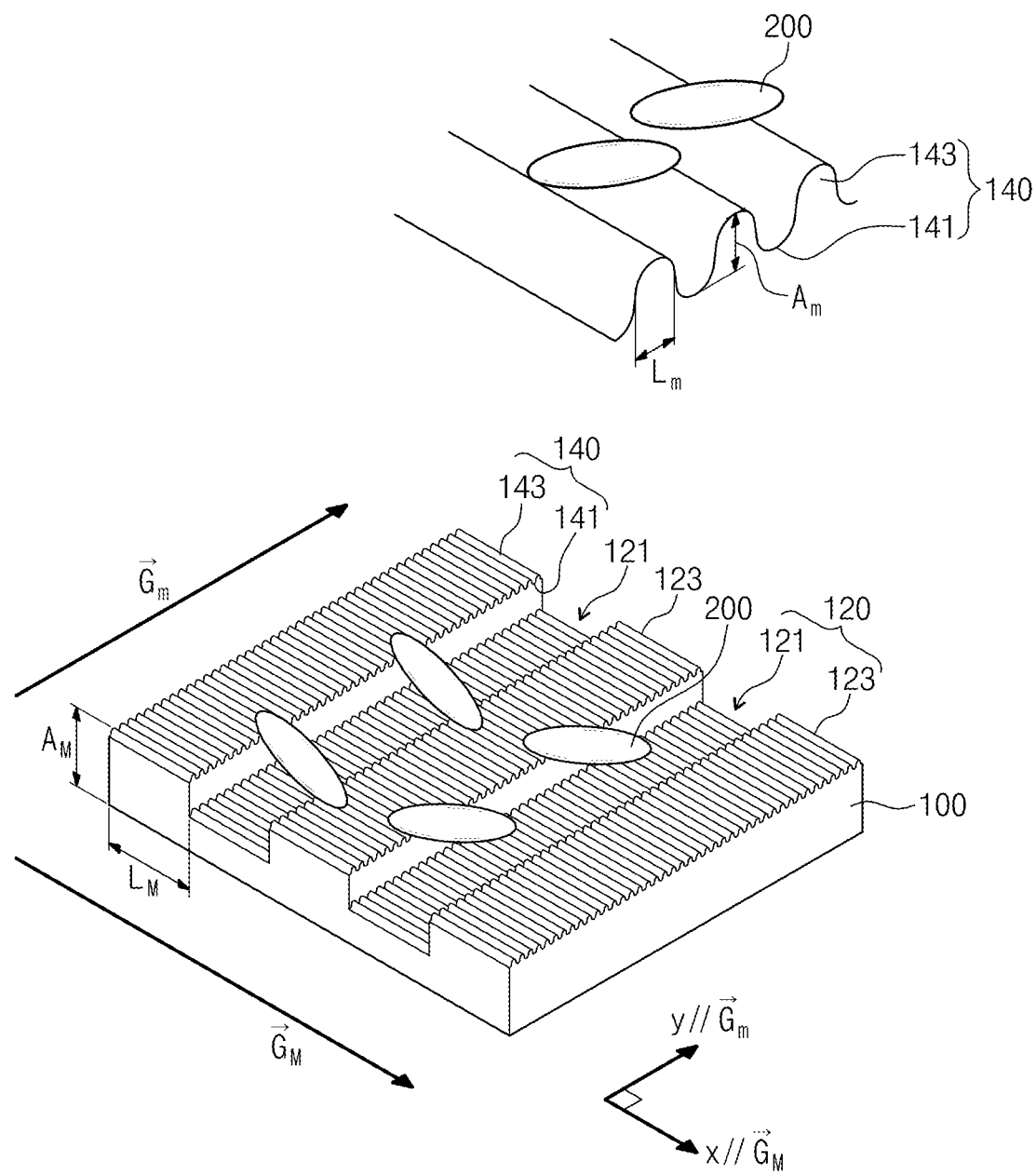
FIG. 3 is a view illustrating multi-stable liquid crystal arrangement according to an embodiment of the inventive concept.

FIG. 3 is a view illustrating multi-stable liquid crystal arrangement according to an embodiment of the inventive concept.

The alignment film 100 includes the macro concavo-convex structure 120 and the micro concavo-convex structure 140 formed on the macro concavo-convex structure 120. That is, the micro-grooves 141 and the micro-projections 143 are formed on each of the macro-grooves 121 and the micro-grooves 141 and the micro-projections 143 are formed on each of the macro-projections 123.

Since azimuthal anchoring energy is proportional to the square of amplitude of a concavo-convex structure and is inversely proportional to the cube of a periodicity, azimuthal anchoring energy $W_{\phi M}$ of a macro concavo-convex structure and azimuthal anchoring energy $W_{\phi m}$ of a micro concavo-convex structure are given as Equations 1 and 2, respectively, as follows.

$$W_{\phi M} \propto A_M^2/\lambda_M^3 \qquad \text{Equation 1}$$

In Equation 1, $A_M$ indicates the amplitude of the macro concavo-convex structure 120 and $\lambda M$ indicates a periodicity of the macro concavo-convex structure 120.

$$W_{\phi m} \propto A_m^2/\lambda_m^3 \qquad \text{Equation 2}$$

In Equation 2, $A_m$ indicates the amplitude of the micro concavo-convex structure 140 and $\lambda m$ indicates a periodicity of the micro concavo-convex structure 140.

The amplitude of a concavo-convex structure corresponds to a height of a groove or a depth of a projection, and a periodicity of a concavo-convex structure corresponds to a total width of a groove and a projection. Accordingly, since the periodicity λ relates to a width of a groove or a projection, the azimuthal anchoring energy of the concavo-convex structure relates to an aspect ratio of the groove.

From Equations 1 and 2, an alignment determination factor G defined as a ratio between $W_{\phi M}$ and $W_{\phi m}$, that is, $W_{\phi M}/W_{\phi m}$ may be obtained as Equation 3 as follows.

$$G = \frac{A_M^2}{\lambda_M^3} \times \frac{\lambda_m^3}{A_m^2} \qquad \text{Equation 3}$$

According to the factor G, the alignment of the liquid crystals on the alignment film of the dual concavo-convex structure may be controlled. The factor G depends on a ratio between of the aspect ratio of the macro-groove 121 and the aspect ratio of the micro-groove 141.

When the azimuthal anchoring energy $W_{\phi M}$ of the macro concavo-convex structure 120 is similar to the azimuthal anchoring energy $W_{\phi m}$ of the micro concavo-convex structure 140, that is, $W_{\phi M} \approx W_{\phi m}$, the factor G approximates to 1, that is, $G=(A_M^2/\lambda_M^3) \times (\lambda_m^3/A_m^2) \approx 1$. Accordingly, liquid crystals 200 are arranged in a bistable state.

Multi-Domain Liquid Crystal Arrangement by Dual Groove Pattern

Figure 4:
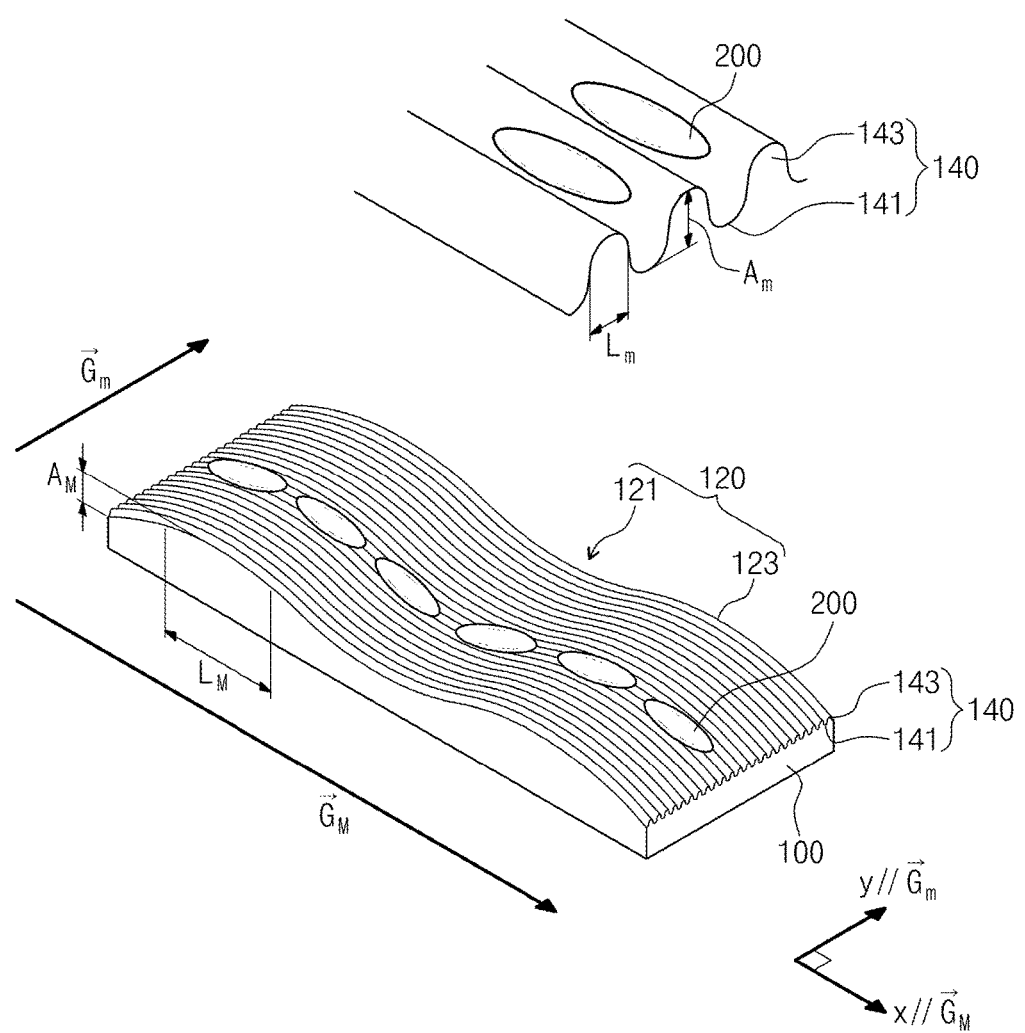
FIG. 4 is a view illustrating multi-domain liquid crystal arrangement according to an embodiment of the inventive concept.

FIG. 4 is a view illustrating multi-domain liquid crystal arrangement according to an embodiment of the inventive concept.

When the azimuthal anchoring energy $W_{\phi M}$ of the macro concavo-convex structure 120 is significantly smaller than the azimuthal anchoring energy $W_{\phi m}$ of the micro concavo-convex structure 140, that is, $W_{\phi M} \ll W_{\phi m}$, the factor G approximates to 0, that is, $G=(A_M^2/\lambda_M^3) \times (\lambda_m^3/A_m^2) \approx 0$ and the liquid crystals 200 are determined in a pretilt angle direction according to a geometry of the macro-groove 121 and are arranged according to the azimuthal anchoring energy of the micro-groove 141, thereby allowing the liquid crystals to be arranged in a multi-domain state.

The multi-domain liquid crystal alignment or the multi-stable liquid crystal alignment may be provided by forming the alignment film having the dual concavo-convex (dual groove) structure and appropriately adjusting the ratio between the aspect ratios of the macro-groove and the micro-groove.

Forming Alignment Film Having Dual Groove Structure

Figure 5:
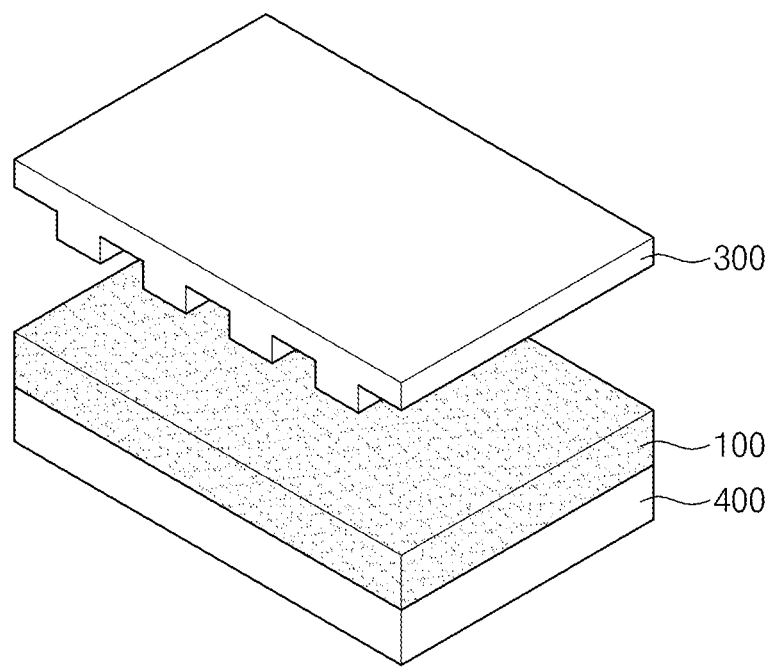
FIG. 5 is a schematic view illustrating alignment film formation according to an embodiment of the inventive concept.
Figure 5:
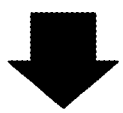
Figure 5:
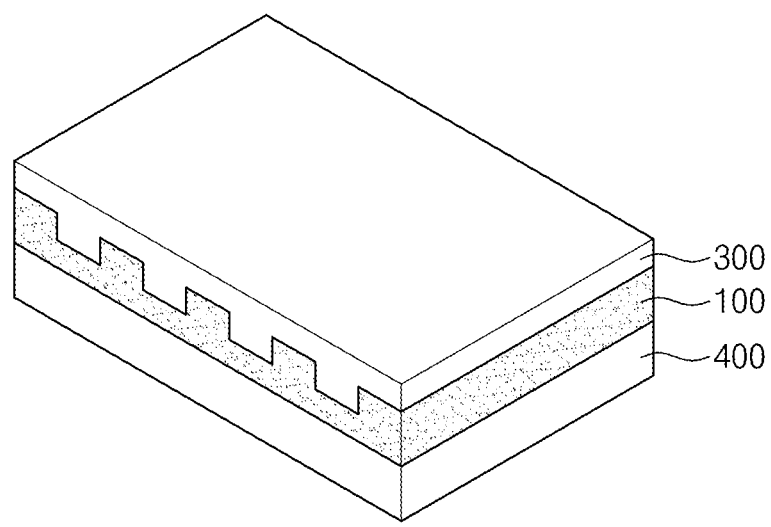

According to one embodiment, an alignment film may be formed by imprinting. FIG. 5 is a schematic view illustrating alignment film formation according to an embodiment of the inventive concept. Referring to FIG. 5, the alignment film is formed by forming an imprinting mold 300 having a dual concavo-convex structure and imprinting the imprinting mold 300 on the alignment film 100 formed on a substrate 400.

Imprinting Mold

Figure 6:
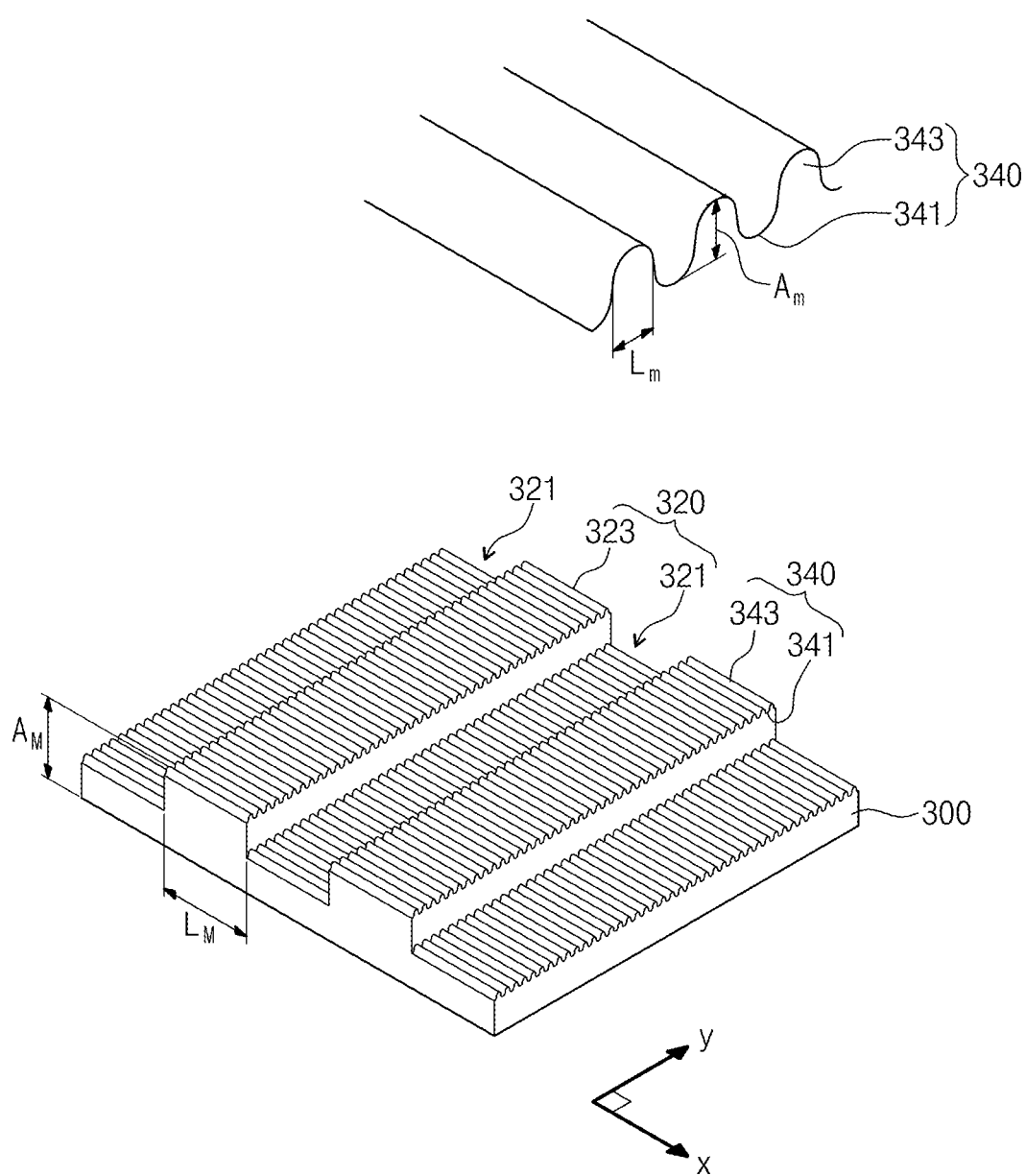
FIG. 6 is a schematic view illustrating a structure of a mold for imprinting according to an embodiment of the inventive concept.

To allow an alignment film to have a dual concavo-convex structure, an imprinting mold may have a dual concavo-convex structure. FIG. 6 is a schematic view illustrating a structure of the imprinting mold 300 for imprinting according to an embodiment of the inventive concept. The imprinting mold 300 includes a first projection 323 corresponding to the first groove 121 of the alignment film of FIG. 1 and a second projection 343 corresponding to the second groove 141 of the alignment film of FIG. 1. The imprinting mold 300 includes a plurality of first projections 323 extending in a first direction, that is, a y-axis direction in FIG. 6 and spaced from one another and a plurality of second projections 343 extending in a second direction, that is, an x-axis direction to intersect the first projections and spaced from one another. The first projection 323 and the second projection, 343 for example, may be perpendicular to one another. That is, the first projections 323 extending in the first direction are periodically arranged in the second direction and the second projections 343 extending in a second direction are periodically arranged in the first direction while being perpendicular to the first projections 323.

From the periodical arrangement of projections, between adjacent projections, a groove defining a projection of the alignment film may be defined. For example, a first groove 321 may be defined between the adjacent first projections 323 and a second groove 341 may be defined between the adjacent second projections 343. A height of the projections of the imprinting mold 300 defines a depth of a groove of the alignment, and a distance between the adjacent projections of the imprinting mold defines a width of the groove of the alignment film.

The first projections 323 and the second projections 343 of the imprinting mold 300 may have mutually different sizes. For example, a depth AM and a width LM of the first projection 323 may be greater than a depth Am and a width Lm of the second projection 343. Similarly to the grooves, for convenience of description and better understanding, in a following description of the alignment film, the projections 323 and the grooves 321, relatively greater, may be designated as macro-projections and macro-grooves, respectively, and the projections 343 and the grooves 341, relatively smaller, may be designated as micro-projections and micro-grooves, respectively. However, sizes of the projections and grooves are not limited to their designations. Also, in the mold 300, a structure, in which the macro-projections 323 and the macro-grooves 321 are alternately arranged, may be designated as a macro concavo-convex structure 320 and a structure, in which the micro-projections 343 and the micro-grooves 341 are alternately arranged, may be designated as a micro concavo-convex structure 340.

It is possible to adjust an aspect ratio of the groove or projection of the alignment film by adjusting an aspect of the projection or groove of the imprinting mold 300, thereby controlling the alignment of liquid crystals on the alignment film.

Figure 7:
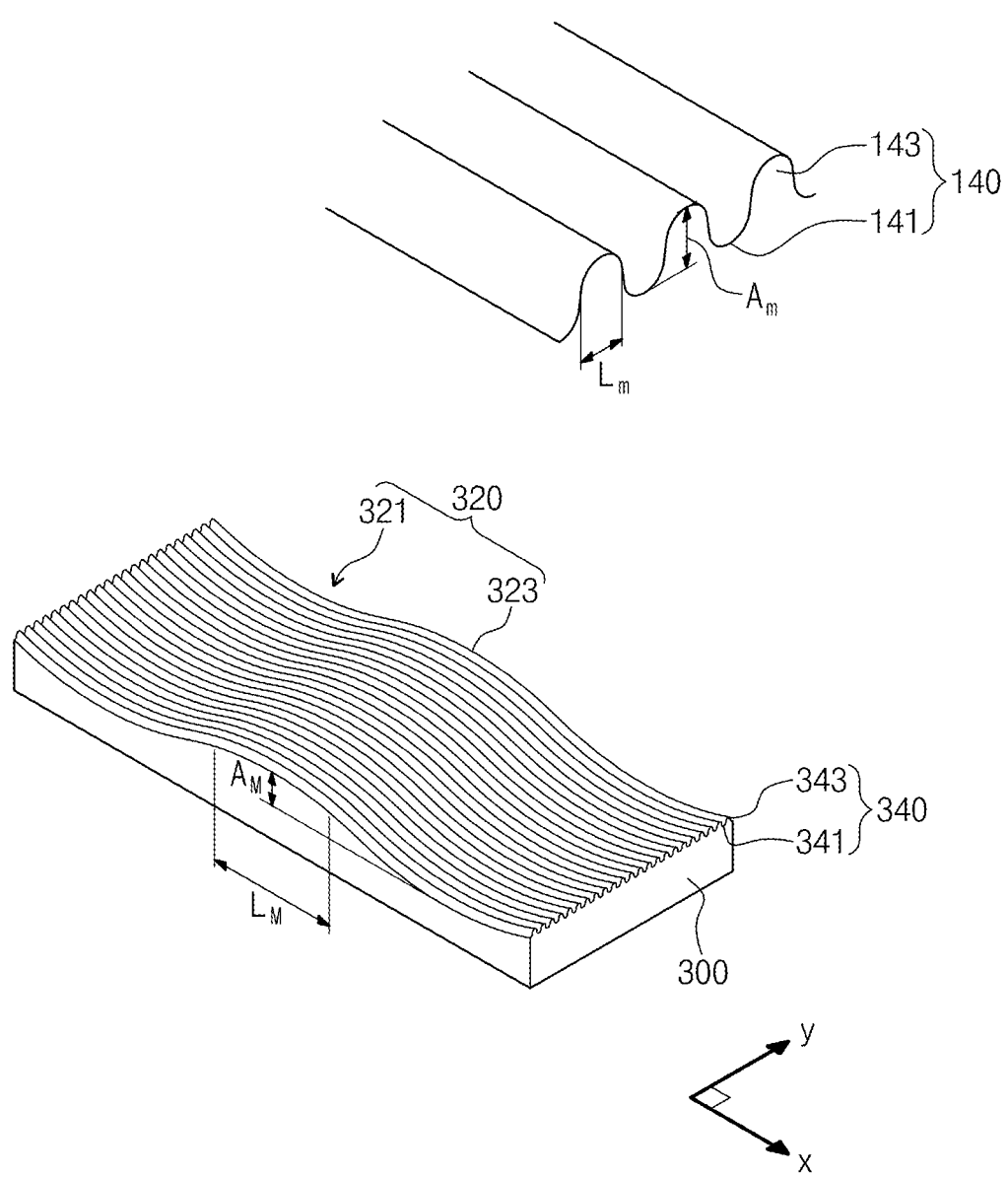
FIG. 7 is a schematic view illustrating a structure of a mold for imprinting according to another embodiment of the inventive concept.

FIG. 7 is a schematic view illustrating a structure of an imprinting mold for imprinting according to another embodiment of the inventive concept. In the embodiment, the imprinting mold is for manufacturing the alignment film of FIG. 2. Compared with the imprinting mold of FIG. 6, the imprinting mold also has a dual concavo-convex structure but has different shapes of projections and grooves. In the embodiment, the imprinting mold has a projection with gentle top surface and sidewall, different from the imprinting mold of FIG. 6 having the slightly flat projection.

Hereinafter, imprinting mold formation will be described.

FIGS. 8 to 12 are views illustrating a method of forming the imprinting mold 300 of FIG. 6 according to an embodiment of the inventive concept. Largely, the method may be divided into a process of forming a macro-projection shown in FIGS. 8 and 9 and a process of forming a micro projection shown in FIGS. 10 to 12.

Figure 8:
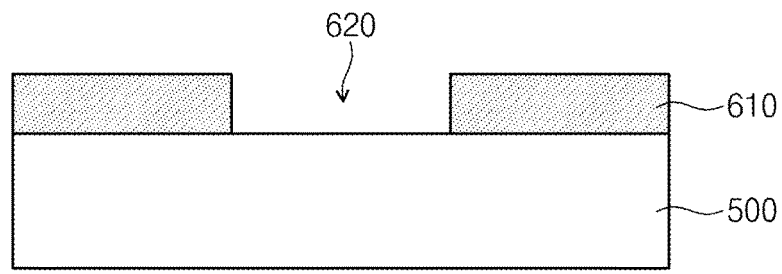
FIGS. 8 to 12 are views illustrating a method of forming the mold for imprinting of FIG. 6 according to an embodiment of the inventive concept.
Figure 9:
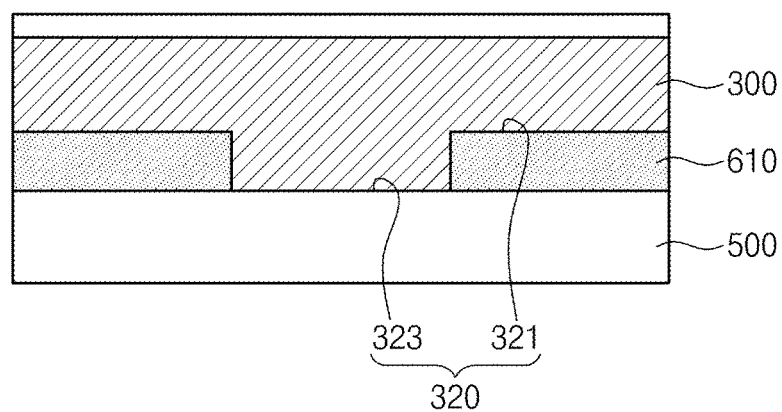

Referring to FIGS. 8 and 9, a method of forming the macro-projection that defines a macro-groove of the alignment film will be described. Referring to FIG. 8, a plurality of projections 610 are formed on a substrate 500 through photolithography. A groove 620 is defined between the projections 610. The projection 610 may be formed by spin-coating the substrate 500 with photoresist and then performing exposing and ashing processes. Alternatively, the projection 610 may be formed by etching the substrate 610 or by patterning an insulting layer or a conductive layer.

Referring to FIG. 9, the mold 300 is prepared. The mold 300 is contact with the substrate 500 formed with the projection 610 and the groove 620 to form a macro-groove 321 corresponding to the projection 610 and a macro-projection 323 corresponding to the groove 620 in the mold 300.

The mold 300, for example, may be formed of an elastic and adhesive material. For example, the mold 300 may be formed of one of polydimethylsiloxane (PDMS), polyurethane, polyurethane containing silicone, polytetramethyloxide, polyethylene oxide, polyoxetane, polyisoprene, polybutadiene, and a combination thereof.

Figure 10:
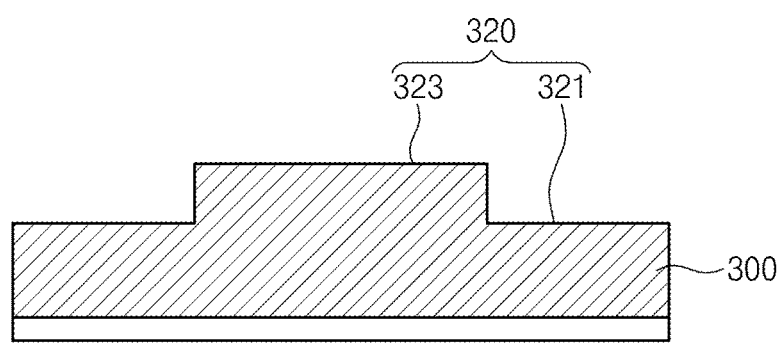
Figure 11:
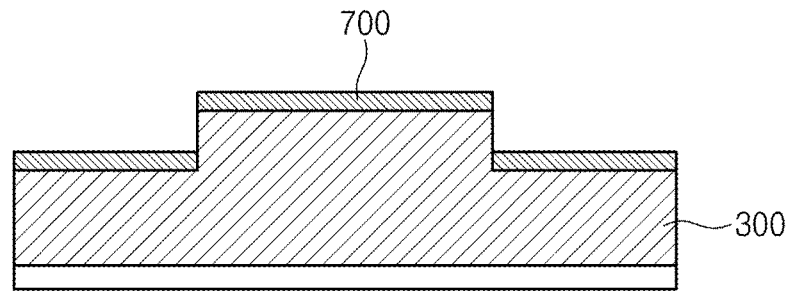
Figure 12:
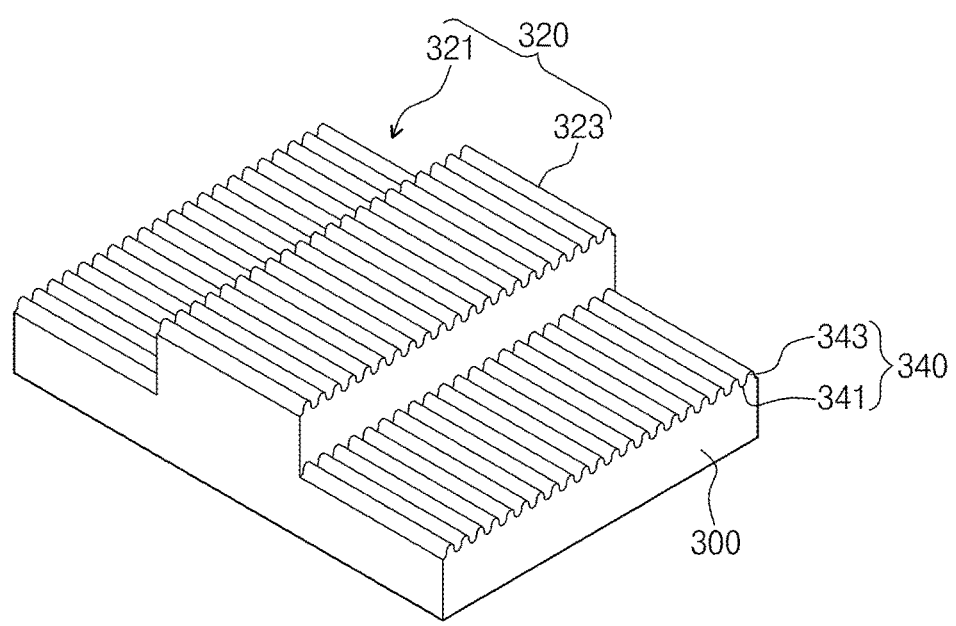

Referring to FIGS. 10 to 12, a method of forming a micro concavo-convex structure on the mold 300 formed with the macro concavo-convex structure 320 having the macro-projections 323 and the macro-grooves 321 will be described. According to the embodiment, a mold formed with a macro concavo-convex structure expands and then anisotropically contracts, thereby allowing a micro concavo-convex structure to be spontaneously formed on the macro concavo-convex structure.

Referring to FIG. 10, the mold 300 formed with the macro concavo-convex structure 320 is treated by heating. The heat treatment is for allowing the mold 300 to expand. For example, the mold 300 formed with the macro concavo-convex 320 may be heated in an oven at a temperature of from about 50 to about 250 for less than about 45 minutes. Due to the heating, the mold 300 thermally expands.

Referring to FIG. 11, the expanded mold 300 is treated with oxygen plasma. The oxygen plasma is for controlling the mold 300 to contract. For example, the mold 300 is exposed with the oxygen plasma with an interval of from about 10 to about 30 minutes. A noncontractive oxidized layer 700 is formed on a mold surface through the oxygen plasma treatment. The oxidized layer 700 on the mold surface has a thermal expansion coefficient relatively lower than a mold not oxidized, thereby functioning as a layer on the surface of the mold 300 for restraining contraction of the mold.

Referring to FIG. 12, the mold 300 heated and expanded due to the heat treatment is cooled down. The cooling down is for allowing the expanded mold to contract. For the cooling down, the mold treated with plasma is left at a room temperature. When the mold contracts, the mold anisotropically contracts due to the macro concavo-convex structure alternately arranged with the macro-grooves and macro-projections. Due to a difference between thermal expansion coefficients of the surface oxidized layer 700 and the mold, the micro concave-convex structure 340 is formed on the macro concavo-convex structure 320. Herein, anisotropic contract of a mold may means that the mold relatively more contracts in one direction along which the projection expands and relatively a little or scarcely contracts (less contracts) in another direction which is perpendicular to the one direction along which the projection expands.

Figure 13:
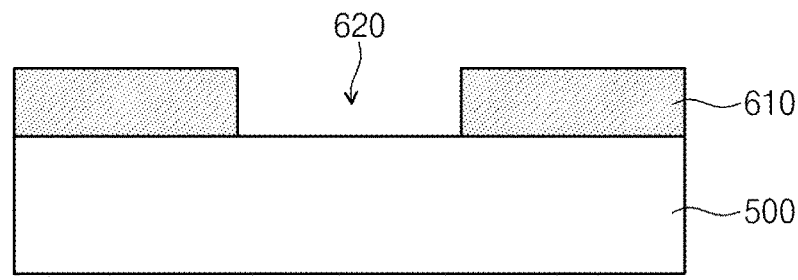
FIGS. 13 to 15 are views illustrating a method of forming the mold for imprinting of FIG. 7 according to an embodiment of the inventive concept.
Figure 14:
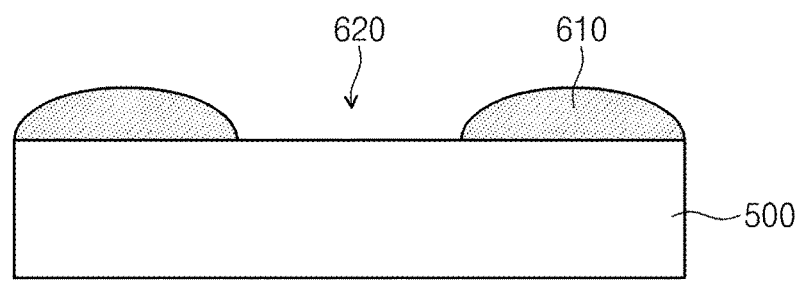
Figure 15:
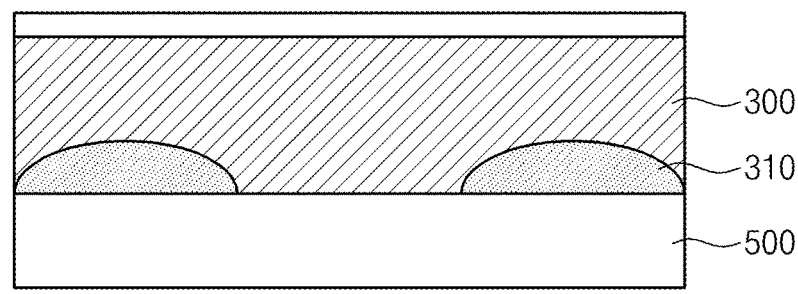

FIGS. 13 to 15 are views illustrating a method of forming the imprinting mold 300 of FIG. 7 according to an embodiment of the inventive concept. In the embodiment, differently from the description with reference to FIGS. 8 to 12, a reflow process with respect to photoresist is performed. Accordingly, a repetitive description will be omitted.

Referring to FIG. 13, a plurality of projections 610 are formed on a substrate 500 through photolithography. A groove 620 is defined between the projections 610.

Referring to FIG. 14, a reflow process is performed on the substrate 500 to allow a corner of a photoresist projection to have a curved profile.

Referring to FIG. 15, a mold 300 is prepared and then is in contact with the substrate 500 formed with the photoresist projection 610 and groove 620. The macro-projection 323 corresponding to the photoresist groove 620 and the macro-groove 321 corresponding to the photoresist projection 610 are formed on the mold 300.

A process after that is identical to the method described with reference to FIGS. 10 to 12. The mold formed with the macro-projection and groove is heated to expand, and then, a contraction control layer is formed on a surface thereof to allow the mold to contract.

Figure 16:
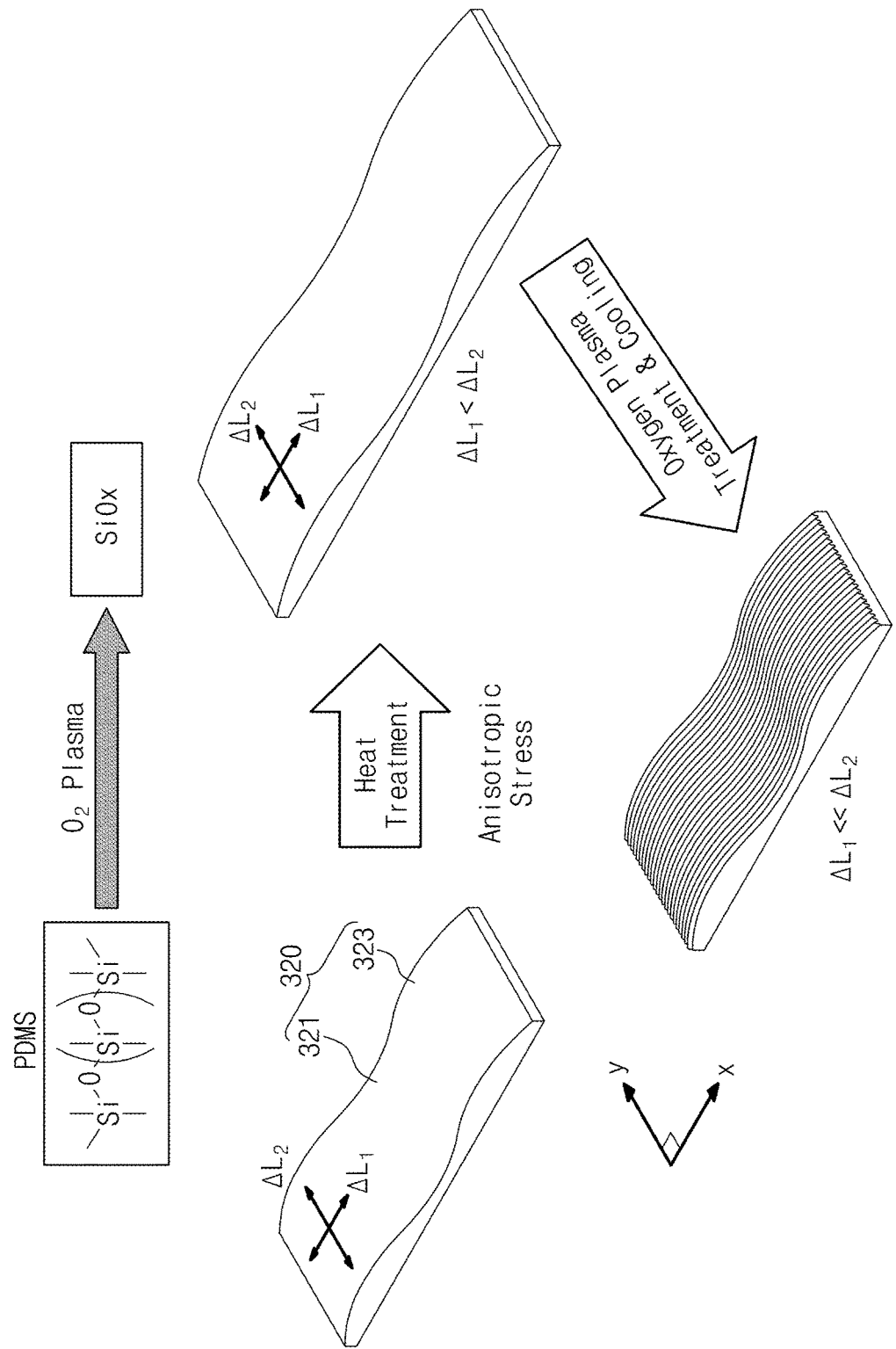
FIG. 16 is a view illustrating a method of forming a micro projection according to an embodiment of the inventive concept.

Forming of the micro concavo-convex structure 320 will be described in detail with reference to FIG. 16. In a description, the mold 300 formed of PDMS is described as an example. In FIG. 16, ΔL1 indicates a change rate in a direction perpendicular to a direction along which the macro projection 323 expands, that is, a direction along which the macro projections are arranged, which is an x-axis direction in the drawing and ΔL2 indicates a change rate in the direction along which the macro projection 323 expands, that is, a y-axis direction in the drawing. Referring to FIG. 16, the PDMS 300 formed with the macro concavo-convex structure 320 is treated by heating. The heat treatment allows the PDMS 300 to expand. For example, the heat treatment may apply anisotropy stress to the PDMS 300 due to the macro concavo-convex structure 320. The heat treatment allows the PDMS 300 to relatively more expand in a direction L2 than in a direction L1 (ΔL1<ΔL2). After allowing the PDMS 300 to expand, a surface thereof is treated with oxygen plasma. When the PDMS 300 is treated with the oxygen plasma, a molecular structure of a PDMS surface is changed similarly to a noncontractive stiff SiOx structure, that is, a contraction restraint layer is formed. Sequentially, the PDMS 300 is left at a room temperature to be cooled down, the PDMS 300, for example, anisotropically contracts due to the macro concavo-convex structure 320 with the macro-grooves 321 and the macro-projections 323 alternately arranged. When the PDMS 300 anisotropically contracts, due to a difference between thermal expansion coefficients of an oxidized layer, which is the contraction restraint layer, and the PDMS 300, the micro concavo-convex structure 340 is formed on the macro concavo-convex structure 320.

Due to the oxygen plasma treatment, a structure of the PDMS surface is changed, thereby forming a surface oxidized layer. The surface oxidized layer may control contraction of the PDMS due to the difference between the thermal expansion coefficients. The surface oxidized layer, for example, may relatively much more restrain the contraction in the direction L1 than in the direction L2 due to the macro concavo-convex structure extending downwards in the direction L2. Accordingly, when the PDMS is cooled down, the PDMS may relatively much more contract in the direction L2 than in the direction L1 (ΔL1<<ΔL2). Accordingly, micro projections extending in the direction L1 perpendicular to the macro projections extending in the direction L2 are spontaneously formed.

Since a relation between change rates in thermal expansion is ΔL1<L2 and a relation between change rates in contraction caused by cooling down after oxygen plasma treatment is ΔL1<<L2, the micro projections are formed in the direction L2, that is, in the direction, in which the macro projections expands. In other words, since the change rate according to the expansion and contraction in the direction L2, that is, a y-axis direction is much greater than the change rate in the direction L1, that is, an x-axis direction, the micro projections are formed in the direction L2, that is, the y-axis direction.

As a layer for restraining the contraction of PDMS, instead of the oxidized layer, any layer having a thermal expansion rate smaller than the PDMS may be used. For example, a metal layer may be formed on the PDMS surface and may be used as the layer for restraining the contraction. As the metal layer, a gold layer formed by electronic beam deposition may be used. A thermal expansion coefficient of PDMS is greater 20 times than a thermal expansion coefficient of gold.

In the embodiment, the oxygen plasma treatment or the metal layer may be performed or formed while performing heat treatment.

Hereinafter, a method of forming an alignment using an imprinting mold will be described.

Figure 17:
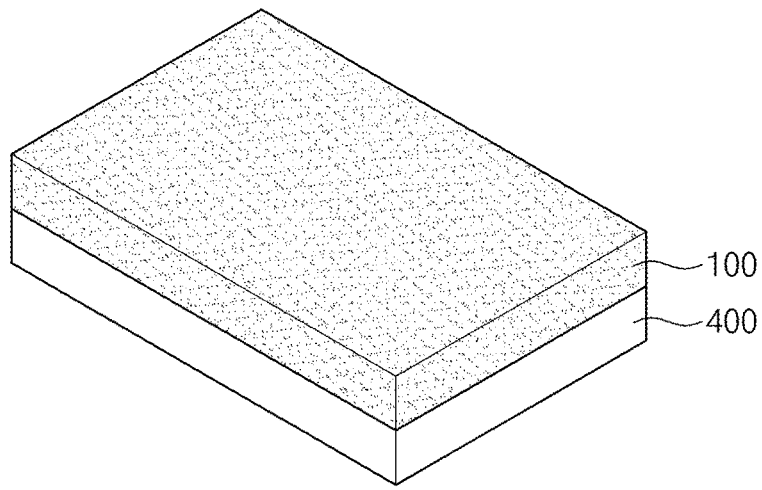
FIGS. 17 to 19 are views illustrating a method of forming an alignment layer using the mold for imprinting described with reference to FIGS. 8 to 12.
Figure 18:
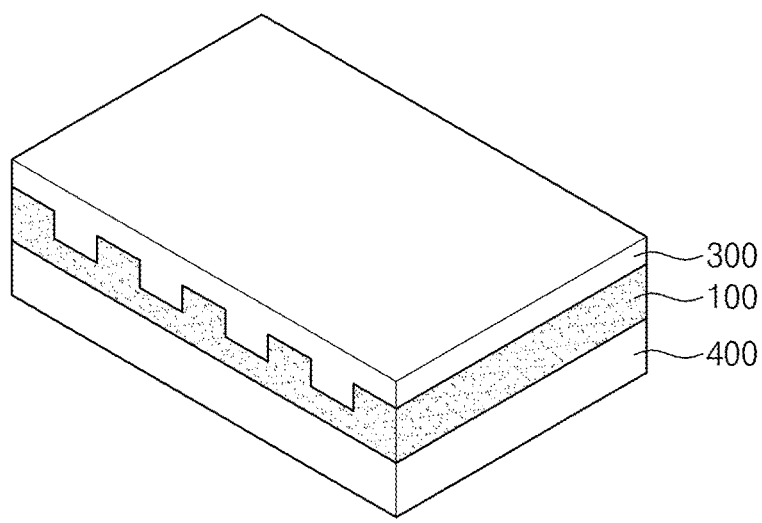
Figure 19:
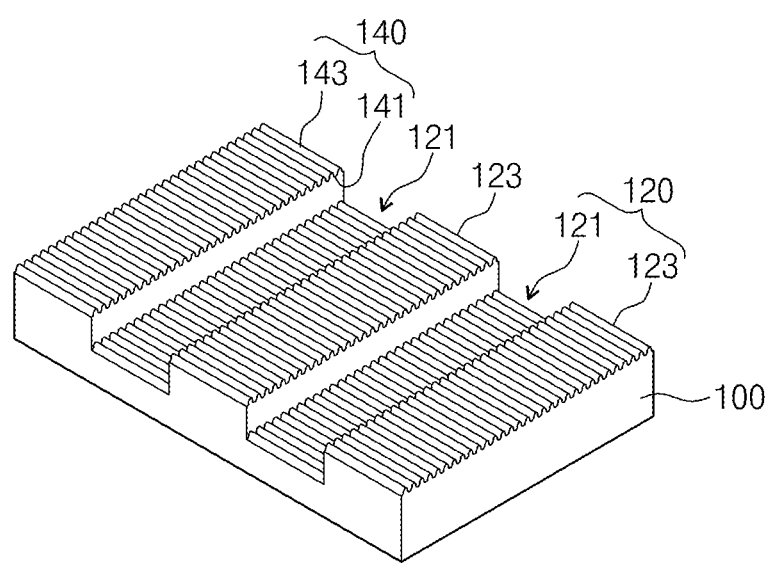

FIGS. 17 to 19 are views illustrating a method of forming an alignment layer using the imprinting mold described with reference to FIGS. 8 to 12. Referring to FIG. 17, an alignment film 100 is formed on a substrate 400. As the alignment film 100, for example, may be formed of polyimide polymer resin.

Referring to FIG. 18, an imprinting mold 300 having a dual concavo-convex structure is imprinted on the alignment film 100 and a process of curing the alignment film is performed. The curing process, for example, may be photocuring using infrared rays. A dual concavo-convex structure 320 and 340 provided on the mold 300 are transferred to the alignment film 100 through imprinting. Accordingly, the alignment film 100 has the dual concavo-convex structure 120 and 140.

Referring to FIG. 19, the mold is removed.

Experimental Example 1

Figure 20:
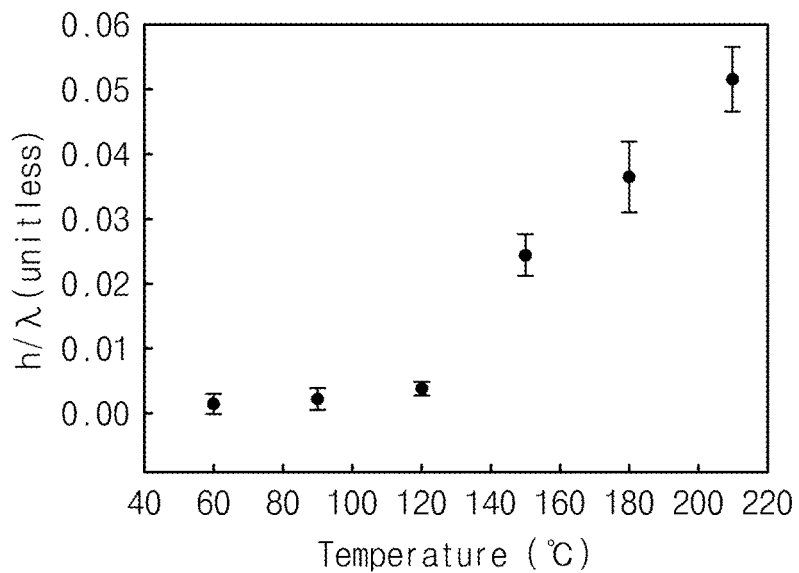
FIG. 20 is a view illustrating a correlation between a heat treatment temperature and an amplitude of a micro concavo-convex structure according to an embodiment of the inventive concept.
Figure 21:
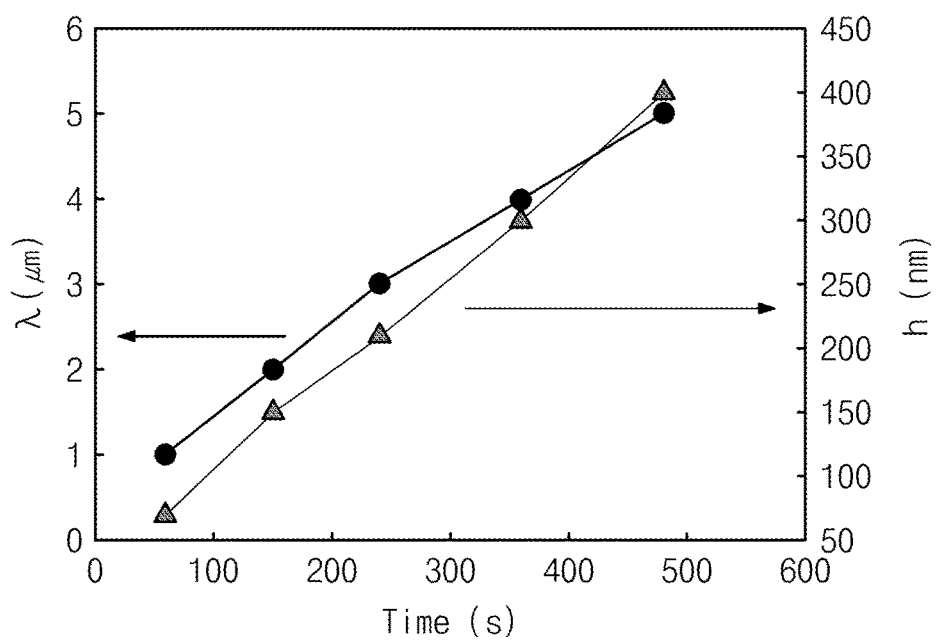
FIG. 21 is a view illustrating a correlation between an oxygen plasma treatment time and a periodicity of a micro concavo-convex structure.

A micro concavo-convex structure was formed controlling a thermal treatment temperature and a plasma treatment time. FIG. 20 is a view illustrating a correlation between a heat treatment temperature and amplitude of a micro concavo-convex structure according to an embodiment of the inventive concept. FIG. 21 is a view illustrating a correlation between an oxygen plasma treatment time and a periodicity of a micro concavo-convex structure.

From a result of an experiment, it was known that the periodicity and amplitude of the micro concavo-convex structure may be controlled by controlling conditions of heat treatment and/or oxygen plasma treatment. As a temperature of heat treatment previous to the oxygen plasma treatment increases, the amplitude of the micro concavo-convex structure to be formed, that is, a height of projections or a depth of micro-grooves increases. Also, as the oxygen plasma treatment time increases, the periodicity of the micro concavo-convex structure, that is, a distance between adjacent micro-projections or a distance between adjacent micro-grooves increases.

The oxygen plasma treatment relates to a thickness of an oxidized layer formed on a PDMS surface, and the heat treatment temperature relates to an amount of anisotropic stress.

On the other hand, the amplitude and periodicity of the micro concavo-convex structure may be easily controlled by appropriately controlling a photolithography process, for example, a thickness of deposited photoresist and a distance between adjacent photoresist patterns.

Accordingly, a multi-domain liquid crystal device and a bistable liquid crystal device may be formed by appropriately controlling the heat treatment temperature, the oxygen plasma treatment time, and/or the photolithography process.

For example, an alignment film was formed by forming the amplitude and periodicity of the macro concavo-convex structure as 1.6 μm and 40 μm, respectively, and forming the amplitude and the periodicity of the micro concavo-convex structure as 0.2 μm and 3 μm, respectively. In this case, an alignment factor G may become $G=(A_M^2/\lambda_M^3)\times(\lambda_m^3/A_m^2)\approx 0.027$ and a multi-domain liquid crystal device may be formed.

Experimental Example 2

Forming of Bistable Liquid Crystal Device

A macro concavo-convex structure was formed by fixing amplitude of the macro concavo-convex structure to be 0.81 μm and variously setting a periodicity to be 5 μm, 6 μm, and 7 μm by controlling a photolithography process. The macro concavo-convex structure was formed on a substrate through the photolithography process and was transferred to a PDMS substrate. PDMS was heated at a temperature of about 180° C. for less than about 1 hour and then was treated with oxygen plasma at about 50 W and about 30 sccm for about 30 seconds. After that, the PDMS was left at a room temperature. After that, a dual concavo-convex structure formed on the PDMS was transferred to an alignment film through imprinting.

Figure 22:
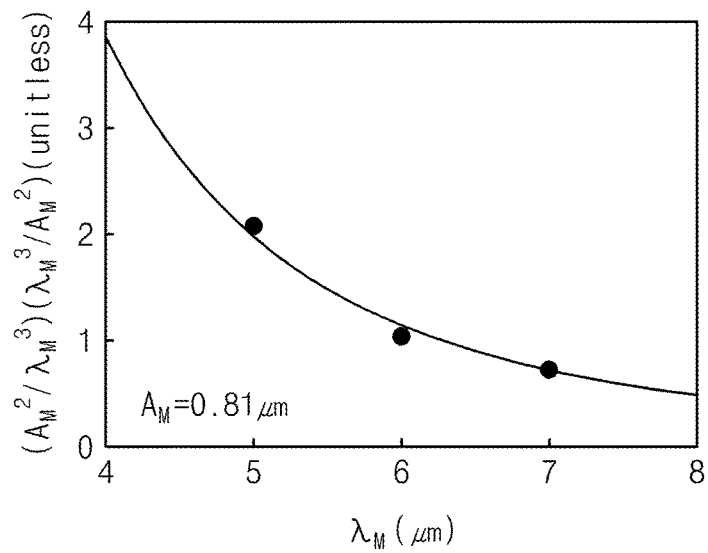
FIG. 22 is a graph illustrating amplitudes and periodicities of a macro concavo-convex structure and a micro concavo-convex structure.

Table 1 is arranged with amplitudes and periodicity of a macro concavo-convex structure and a micro concavo-convex structure, and FIG. 22 is a graph relates thereto.

TABLE 1

| | | | |
|---|---|---|---|
| $\lambda_M$ | 5 3 μm | 6 μm | 7 μm |
| $\lambda_m$ | 1.07 μm | 0.91 μm | 1.052 μm |
| $A_m$ | 0.0556 μm | 0.0470 μm | 0.0555 μm |
| $A_M^2/\lambda_m^3$ | 0.00252 μm | 0.00242 μm | 0.00264 μm |

It is fixed as AM=0.81 μm.

Referring to Table 1 and FIG. 22, it may be known that there is no great difference in azimuthal anchoring energy of the micro concavo-convex structure at mutually different periodicity of the macro concavo-convex structure. Accordingly, an alignment determination factor G may be easily controlled by controlling the periodicity of the macro concavo-convex structure, that is, through controlling a photolithography process.

Figure 23:
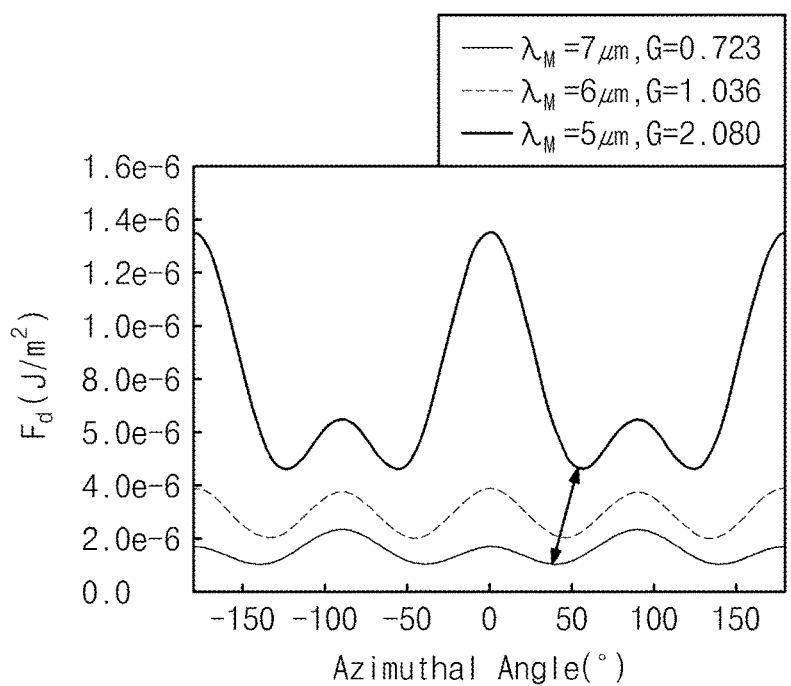
FIG. 23 is a graph illustrating density of surface free energy according to a fluctuation of an alignment determination factor G related to FIG. 22 with respect to an azimuthal angle function.

FIG. 23 is a graph illustrating density of surface free energy according to a fluctuation of the alignment determination factor G with respect to an azimuthal angle function.

The density of surface free energy is given as Equation 4 as follows.

Equation 4

$$F_d = \frac{1}{4}K_3 A_M^2 \left(\frac{2\pi}{\lambda_M}\right)^3 \left[\frac{\sin^2\theta_p}{p_1(\theta_p)}\left\{\sin^2\theta_p + k_3\cos^2\theta_p\left(2 - k_3\frac{p_1(\theta_p)p_2(\theta_p) - \cos^2\theta_p}{\sin^2\theta_p}\right)\right\} + G\frac{\cos^2\theta_p}{q_1(\theta_p)}\left\{\cos^2\theta_p + k_3\sin^2\theta_p\left(2 - k_3\frac{q_1(\theta_p)q_2(\theta_p) - \sin^2\theta_p}{\cos^2\theta_p}\right)\right\}\right]$$

In Equation 4, $q_p$ is an angle between a liquid crystal director and a direction, in which a macro-groove expands $k_3=(K_2+K_{24})/K_3$, $p_i(q_p)=\{\cos^2 q_p + (K_3/K_i)\sin^2 q_p\}^{1/2}$, $q_i(q_p)=\{\sin^2 q_p + (K_3/K_i)\cos^2 q_p\}^{1/2}$ (i=1,2), $G=(A_m/A_M)^2 (l_M/l_m)^3$, $A_M$, $l_M$, $A_m$, and $l_m$ are amplitudes and periodicity of a macro concavo-convex structure and a micro concavo-convex structure, respectively, $K_1$, $K_2$, $K_3$, and $K_{24}$ are splay, twist, bend, and saddle-splay elastic constants, respectively.

Referring to FIG. 23, when the periodicity of a macro projection structure is 5 μm, 6 μm, and 7 μm, respectively, the alignment determination factor G is 0.732, 1.036, and 2.080.

Figure 24:
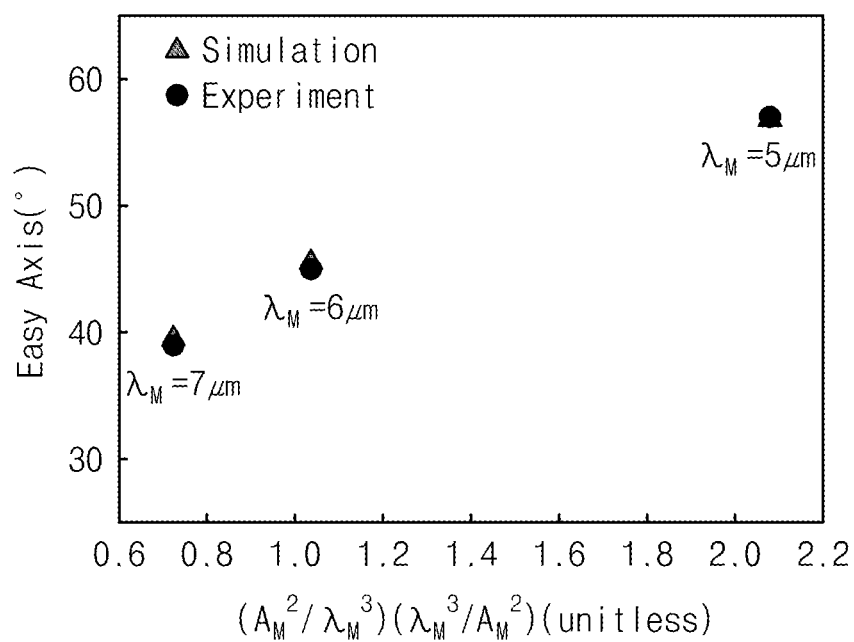
FIG. 24 is a graph illustrating an easy azimuthal axis according to the alignment determination factor G, in which there are shown a simulation (shown as a triangle) based on Equation 4 and an experimental example 2 (shown as a circle)

FIG. 24 is a graph illustrating an easy azimuthal axis according to the alignment determination factor G, in which there are shown a simulation (shown as a triangle) based on Equation 4 and an experimental example 2 (shown as a circle). Referring to FIG. 23, it may be known that the result of the experiment and the simulation approximately coincide.

From Equation 4, an easy bistable axis of the liquid crystals ±39.56, ±45.55, and ±56.88, respectively, from $K_3/K_1=1.3$, $K_3/K_2=2.2$, $k_3\approx 0.07$. A fixing force of the macro projection structure is reduced by reducing the periodicity of the macro concavo-convex structure, thereby allowing the easy azimuthal axis of the liquid crystals to vary according thereto. Also, when the micro concavo-convex structure is changed, that is, the amplitude and periodicity are changed, similarly, a fluctuation occurs in the easy azimuthal axis. This is, it indicates that the easy azimuthal axis of the liquid crystal director may be easily controlled by changing an azimuthal fixing force of the dual concavo-convex structure. As an example, when G=1.036, $l_M$=6 μm, and $K_3$ $9*10^{-12}$, azimuthal anchoring energy is $W\approx 2.04*10^{-5}$ J/cm².

Figure 25:
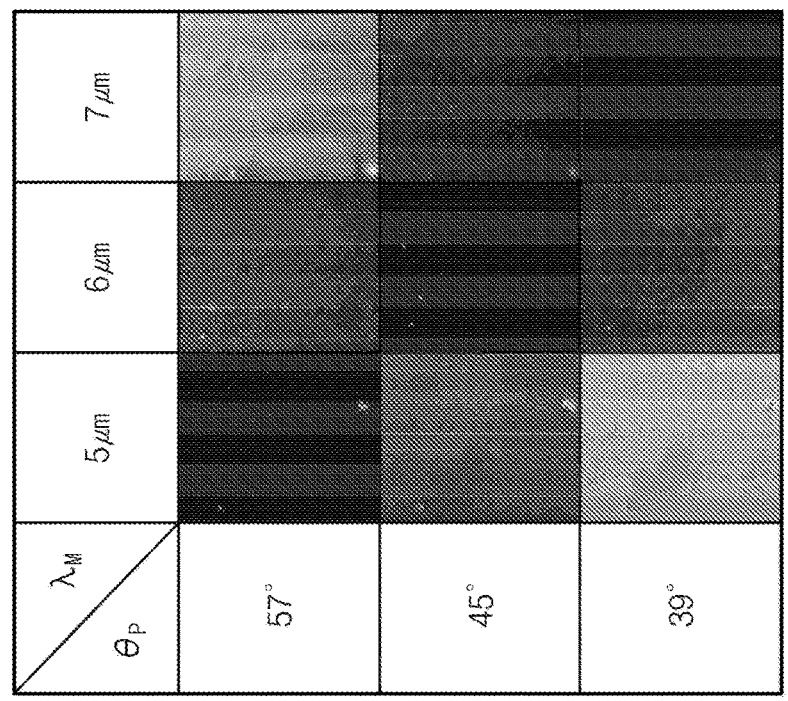
FIG. 25 is a polarizing microscope image of liquid crystals according to a periodicity of a macro concavo-convex structure according to an embodiment of the inventive concept.
Figure 25:
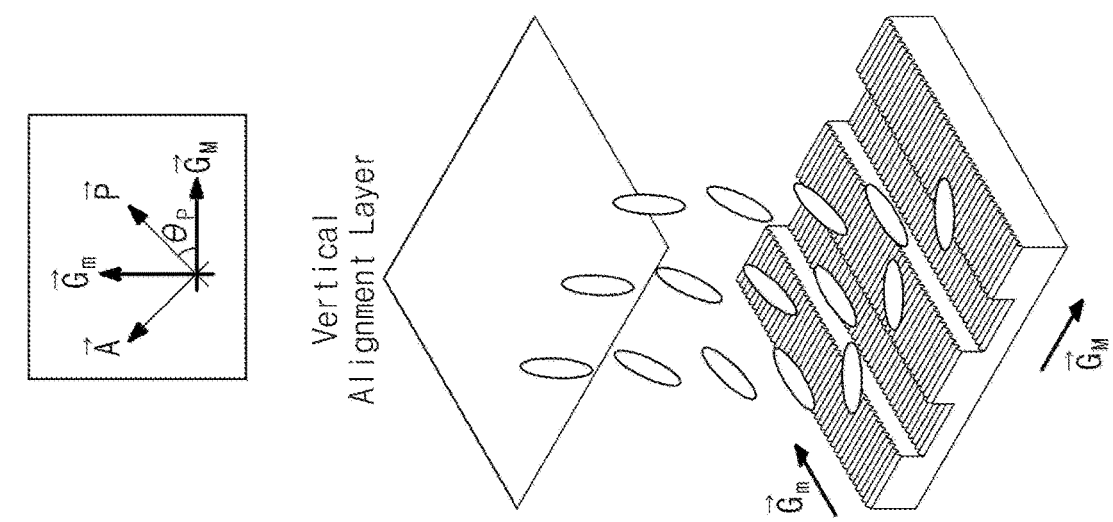

To experimentally check the easy bistable axis of the liquid crystal director, a mixed liquid crystal cell filled with 4-n-pentyl 4' cyanobiphenyl (5CB) was actually manufactured. As a top alignment film, it was coated with a vertical liquid crystal alignment layer without a rubbing process. As a bottom alignment film, the alignment film having the dual concavo-convex structure was used. FIG. 25 is a polarizing microscope image of liquid crystals according to the periodicity of the macro concavo-convex structure according to an embodiment of the inventive concept. The easy azimuthal axis of the liquid crystal director varied with the periodicity of the macro concavo-convex structure.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

The invention claimed is:

1. An alignment film for aligning liquid crystals of a liquid crystal display (LCD), the alignment film comprising:
   a plurality of first grooves extending in a first direction and spaced from one another; and
   a plurality of second grooves extending in a second direction to intersect the first grooves and spaced from one another,
   wherein a ratio of a first azimuthal anchoring energy according to the first grooves to a second azimuthal anchoring energy according to the second grooves is about 0 or 1, and
   the liquid crystals on the alignment film are arranged in a multi-domain state or multi-stable state according to the ratio of the first azimuthal anchoring energy to the second azimuthal anchoring energy.

2. The alignment film of claim 1, wherein widths and depths of the first grooves are greater than the widths and depths of the second grooves, respectively.

3. An LCD comprising:
a first substrate and a second substrate facing each other; and
a first alignment film and a second alignment film for aligning liquid crystals and being on opposing surfaces of the first substrate and the second substrate, respectively,
wherein the first alignment film and the second alignment film each comprises:
  a plurality of first grooves extending in a first direction and spaced from one another; and
  a plurality of second grooves extending in a second direction to intersect the first grooves and spaced from one another,
wherein a ratio of a first azimuthal anchoring energy according to the first grooves to a second azimuthal anchoring energy according to the second grooves is about 0 or 1, and
the liquid crystals on the first alignment film and the second alignment are arranged in a multi-domain state or multistable state according to the ratio of the first azimuthal anchoring energy to the second azimuthal anchoring energy.

4. A multi-stable LCD comprising:
a first substrate and a second substrate facing each other; and
a first alignment film and a second alignment film for aligning liquid crystals and being on opposing surfaces of the first substrate and the second substrate, respectively,
wherein the first alignment film and the second alignment film each comprises:
  a plurality of first grooves extending in a first direction and spaced from one another; and
  a plurality of second grooves extending in a second direction to intersect the first grooves and spaced from one another, and
wherein a ratio of a first azimuthal anchoring energy according to the first grooves to a second azimuthal anchoring energy according to the second grooves is about 1, and
the liquid crystals on the first alignment film and the second alignment are arranged in a multi-stable state according to the ratio of the first azimuthal anchoring energy to the second azimuthal anchoring energy.

5. A multi-domain LCD comprising:
a first substrate and a second substrate facing each other; and
a first alignment film and a second alignment film for aligning liquid crystals and being on opposing surfaces of the first substrate and the second substrate, respectively,
wherein the first alignment film and the second alignment film each comprises:
  a plurality of first grooves extending in a first direction and spaced from one another; and
  a plurality of second grooves extending in a second direction to intersect the first grooves and spaced from one another, and
wherein a ratio of a first azimuthal anchoring energy according to the first grooves to a second azimuthal anchoring energy according to the second grooves is about 0, and
  the liquid crystals on the first alignment film and the second alignment are arranged in a multi-domain state according to the ratio of the first azimuthal anchoring energy to the second azimuthal anchoring energy.

6. A liquid crystal alignment method applied to an LCD, the method comprising forming a plurality of first grooves extending in a first direction and spaced from one another and a plurality of second grooves extending in a second direction to intersect the first grooves and spaced from one another,
wherein one of multi-stable liquid crystal alignment and multi-domain liquid crystal alignment is selectively enabled by controlling a ratio of a first azimuthal anchoring energy according to the first grooves to a second azimuthal anchoring energy according to the second grooves to be about 0 or 1.

* * * * *